United States Patent

Vega, Jr.

[11] Patent Number: 5,160,518
[45] Date of Patent: Nov. 3, 1992

[54] SECOND CHANCE SECONDARY SMOKE TRAP

[76] Inventor: Joseph G. Vega, Jr., 6237 Rockwell St., Oakland, Calif. 94618

[21] Appl. No.: 709,642

[22] Filed: Jun. 3, 1991

[51] Int. Cl.⁵ .................... A24F 19/10; B01D 46/44
[52] U.S. Cl. .................... 55/385.8; 55/420; 131/200; 131/212.1; 131/215.1
[58] Field of Search ............ 55/385.8, 418, 420; 422/120, 122; 131/200, 201, 202, 206, 212.1, 215.1, 334

[56] References Cited

U.S. PATENT DOCUMENTS

| | | | |
|---|---|---|---|
| 3,807,148 | 4/1974 | Fike et al. | 55/385.8 |
| 4,043,776 | 8/1977 | Orel | 55/385.8 |
| 4,119,419 | 10/1978 | Passaro et al. | 55/385.8 X |
| 4,790,332 | 12/1988 | Wallace | 131/206 X |
| 4,899,766 | 2/1990 | Ross, Jr. | 131/212.1 X |
| 4,993,435 | 2/1991 | McCann | 131/206 X |
| 5,048,545 | 9/1991 | Takagi et al. | 131/206 X |

Primary Examiner—Richard L. Chiesa
Attorney, Agent, or Firm—Michael I. Kroll

[57] ABSTRACT

An air tight cylindrical U shaped or angled tube that can be assembled and disassembled. The U tube is constructed of polystyrene or another non flammable material. A fan unit (12) pushes fresh air into one end of the combustion chamber tube (300). A cigar or cigarette is held within the combustion chamber tube 300 with a stainless steel support (10). The smoking medium is ignited via an ignition access port (15). One can inhale smoke via a one way inhalation valve (9). Then, one can exhale secondary smoke into a filtration chamber tube (100) via a oneway exhalation valve (6). Primary and secondary smoke are filtered within the unit by an activated carbon filter (5) prior to returning to the outside environment.

2 Claims, 1 Drawing Sheet

SECOND CHANCE SECONDARY SMOKE TRAP

BACKGROUND-FIELD OF INVENTION

This invention relates to air circulation and filtration. Specifically, to enclosing the combustion process of cigarettes and cigars and filtering out smoke particles before combusted and exhaled gases are returned to room or outside air.

BACKGROUND-DESCRIPTION OF PRIOR ART

It is quite clear that rules governing the smoking of cigarettes and cigars are becoming more restrictive. Those individuals who prefer to smoke are less able to do so because the gases resulting from the combustion of the preferred smoking medium and the exhalation of previously inhaled smoke affect the surrounding environment. At times, to the discomfort of other people who are close by. As a result, those people who prefer to smoke must leave offices or other indoor areas and possibly outdoor areas where smoke sensitive individuals might be located. This can be a waste of time for the smoker. Even outdoors, the gases from the smoking process affect the environment and the comfort of others.

Some studies have indicated that secondary cigarette and cigar smoke is deleterious to the health of others who must involuntarily breathe the affected air. Those people who are very sensitive or allergic to contamination of the environmental air quality must resort to using respiration, or filtration, devices in areas where smoking is permitted. While personal air filtration devices such as gas masks are readily available, these devices place the burden of protection on the non-smoking individual who is not the environmental offender. The person who chooses to smoke should take the responsibility of protecting the air quality and the good health of others.

Other than placing a smoker in a separate compartmented room, there has really been no device known to this inventor which attempts to both contain and filter the smoking process from the surrounding air and the lungs of non-smokers. However, all the components that would perform such a process have been in the public domain for quite some time:

1. A non-flammable, non-porous containing medium to hold and direct smoke.
2. A small electrical fan unit to drive the smoke filled air in the desired direction and supply fresh air to the holding medium.
3. One way air flow valves to direct smoke in a desired direction, disallow backflow and hold smoke in the containing medium until a filtration process is completed.
4. An activated carbon filter, such as found in military gas masks, to remove smoke particles from combusted materials and exhaled gases allowing filtered air back to the environment.

Until now, none of these components has been put into proper dimension or in an appropriate order to enable their combined function to effectively contain and filter the gases from the smoking process.

OBJECTS AND ADVANTAGES

This conveniently scaled device will allow smokers to enjoy their activities while greatly reducing the secondary smoke output to the surrounding air. Several objects and advantages of the present invention are:

(a) To allow the smoking of cigarettes or cigars while greatly reducing the environmental effects of the combustion of tobacco and the exhalation of gases from the smoking process.
(b) To provide a device which is conveniently scaled for use, storage, and fashion.
(c) To provide a unit that is easily cleaned and maintained in efficient working order.
(d) To provide replacement parts that can be interchanged with worn-out or damaged parts of the original unit.

Further objects and advantages are to provide individuals who wish to smoke the option to protect the environment and the health of others. The unit will be relatively inexpensive. Once the main unit is obtained, spare parts and supplies will be available to maintain the unit. The unit will be adaptable for loose tobacco mixes such as pipe tobacco with additional modification.

BRIEF DESCRIPTION OF THE DRAWINGS

In the drawings, closely related figures have the same numbers but different alphabetical suffixes.

Figure 1:
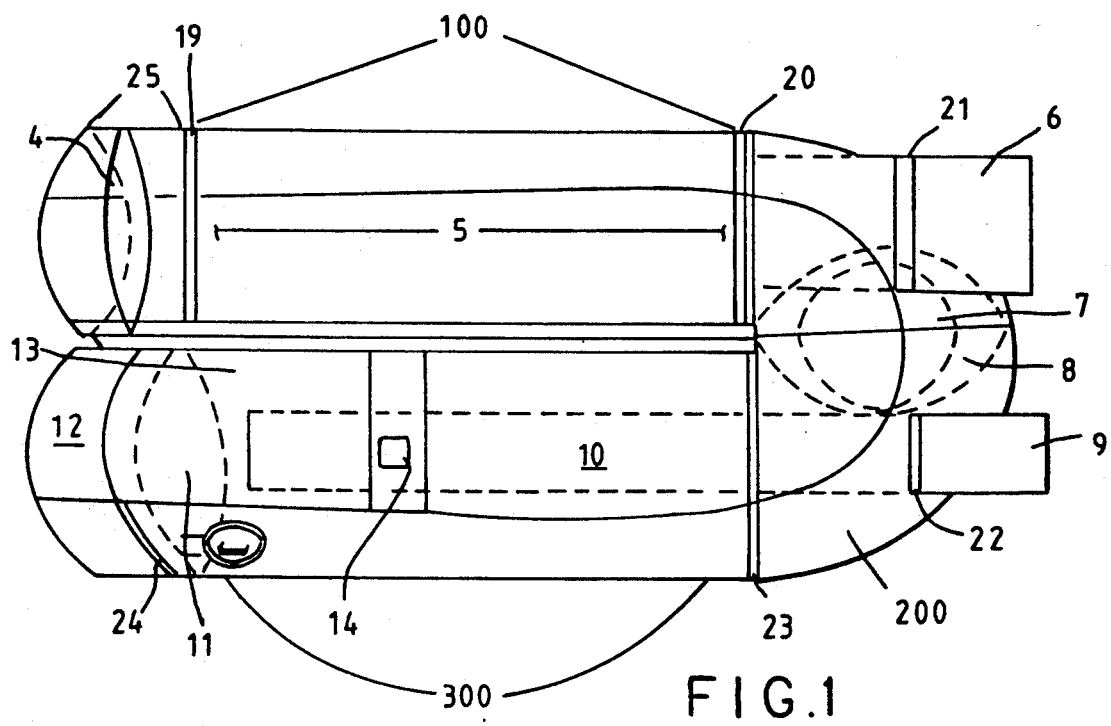
FIG. 1 shows a top view of the SECONDARY SMOKE TRAP.

Reference Numerals In Drawings
100 filtration chamber tube
200 U tube connector
300 combustion chamber tube
4 one way exit valve
5 activated carbon filter
6 one way exhalation valve
7 interior one way air flow valve
8 wire mesh partical filter
9 one way inhalation valve
10 stainless steel support
11 one way fresh air entrance valve
12 DC electrical fan
13 DC battery pack
14 on-off variable speed switch
15 ignition access plug-port
16 wire mesh spark suppressor
17 ash collection chamber
18 ash puller
19 O ring sealer
20 O ring sealer
21 O ring sealer
22 O ring sealer
23 O ring sealer
24 O ring sealer
25 end tube section
26 9 cm×1 cm slot

DETAILED DESCRIPTION OF THE PREFERRED EMBODIMENT

Figure 2:
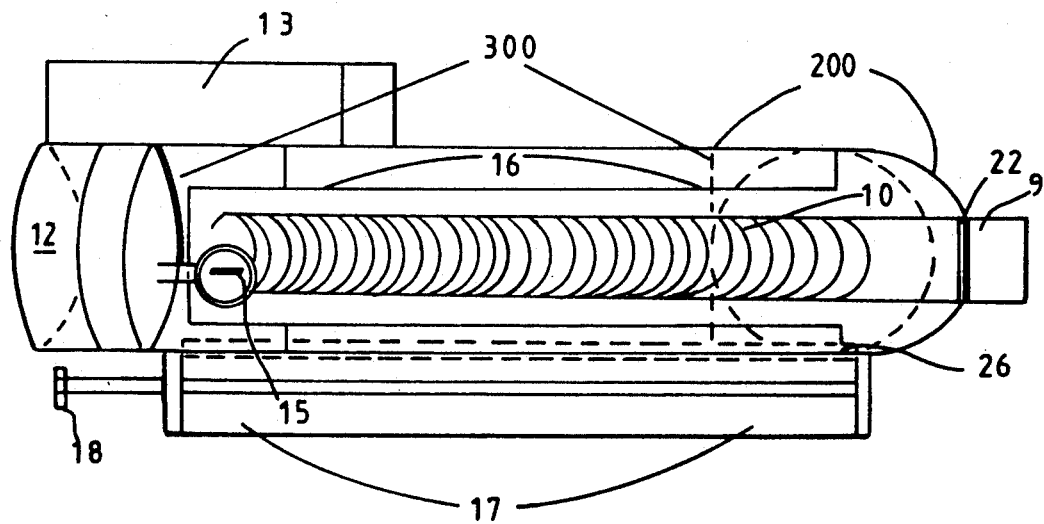
FIG. 2 shows a side view of the SECONDARY SMOKE TRAP combustion chamber.

A typical embodiment of the present invention is illustrated in FIG. 1 (top view), FIG. 2 (side view). The SECOND CHANCE SECONDARY SMOKE TRAP is a U shaped cylindrical tube. In the preferred embodiment, the cylindrical tube is 3.5 cm in uniform diameter and constructed from a clear solid plastic such as polystyrene available from M & T Plastics of Syracuse, N.Y. However, the tubing could also be constructed from any other non-porous, flame retardant material such as aluminum.

In FIG. 1, at one end of the U tube is a DC electrical fan 12 which is energized by a DC battery pack 13. The fan speed is controlled with a on-off variable speed switch 14. The fan and battery pack units are pressure fitted into a combustion chamber tube 300. The pressure fit seal is enhanced for air tightness with a rubber O ring sealer 24 on the inside diameter of the tube section juncture.

The combustion chamber tube 300 houses a one way fresh air entrance valve 11. The combustion chamber tube is pressure fitted into a U tube connector 200. A rubber O ring sealer 23 on the inside diameter of this juncture enhances air tightness. A filtration chamber tube 100 is pressure fitted into the other end of the U tube connector section 200. Air tightness is enhanced with a rubber O ring sealer 20 on the inside diameter of this juncture.

An end tube section 25 containing a one way exit valve 4 is pressure fitted into the other end of the filtration chamber tube 100. A rubber O ring sealer 19 on the inside diameter of this juncture enhances air tightness.

The DC electrical fan 12, the DC battery pack 13 and the combustion chamber tube 300 form the combustion chamber of the SECONDARY SMOKE TRAP FIG. 2. An ignition access plug/port 15 is cut into the combustion chamber tube 300. A wire mesh spark suppressor 16 is fitted inside combustion chamber tube 300. An approximate 9 cm long×1 cm wide slot 26 is cut into the bottom of the combustion chamber tube 300 to allow ash sediment to enter an ash collection tube 17. An ash puller 18 is pressure fitted into the ash collection tube 17.

The U tube connector 200, FIG. 1 houses an interior one way air flow valve 7 and a wire mesh particle filter 8. A one way inhalation valve 9 and stainless steel support 10 are screw fitted into the combustion chamber side of the U tube connector 200. This union is made airtight with an O ring sealer 22 fitted on the inside diameter of this juncture.

In FIG. 1 a one way exhalation valve 6 is screw fitted into the filtration chamber side of the U tube connector 200. This union is made air tight with an O ring sealer 21 on the inside diameter of this junction. An activated carbon filter unit 5 is inserted into the filtration chamber tube 100.

Operation-FIGS. 1 and 2

The manner of using the SECOND CHANCE SECONDARY SMOKE TRAP to smoke and filter smoke from cigarettes and cigars is much like that of the current smoking practice. However, one must first set up the containment apparatus shown in FIG. 2.

First, one must unscrew a one way inhalation valve 9 withdrawing the part and a stainless steel support 10 which is fitted in the oneway inhalation valve. One can then slip a cigarette or cigar into the open end of the stainless steel support 10. Once the cigarette or cigar is secured by a pressure fit into the stainless steel support 10 and the one way inhalation valve 9 the parts can be screwed fitted back into the U tube connector 200. This completes the cigar/cigarette insertion set up process.

To ignite the cigar/cigarette first turn on and adjust the DC electrical fan 12 unit and adjust the speed for adequate fresh air flow with the on/off variable speed switch 14. With fresh air supply in the combustion chamber one can open the ignition access plug/port 15 and insert a lit match or flame to the end of the cigar/cigarette which is near the open end of the stainless steel support 10. Then the ignition access port is closed.

Fresh air pushed into the combustion chamber 300 by the DC electrical fan 12 keeps the tobacco lit and directs smoke toward the U tube connector 200 and filtration chamber 100. One way fresh air entrance valve 24 and the interior one way air flow valve 7 keep smoke from backflowing out of the combustion chamber 300 and filtration chamber 100 respectively.

Inhalation of smoke is via the one way inhalation valve 9. Upon satisfaction, or necessity, one can exhale secondary smoke through the one way exhalation valve 6 into the filtration chamber 100. The activated carbon filter 5 scrubs smoke particles from the exhaled air and allows a filtered gas to pass through the one way exit valve 4 back into the environment.

Depending on the smoking medium, one can set the on-off variable speed switch 14 to make the DC electrical fan 12 push more or less fresh air into the combustion chamber 300.

A wire mesh spark supressor 16 keeps lit ashes from dropping onto the surface of the combustion chamber 300. The wire mesh spark supressor 16 also directs ashes toward an ash collection tube 17. As ashes fill up the ash collection tube 17 one can withdraw the ash puller 18 from this tube ejecting ashes from the ash collection tube.

A wire mesh partical filter 8 in the U tube connector 200 inhibits the entrance of ashes into the filtration chamber 100.

All parts of the SECOND CHANCE SECONDARY SMOKE TRAP except the DC electrical fan unit 12 and DC battery pack 13 are made of plastic, rubber, copper, aluminum or stainless steel. Parts are pressure/friction fitted or screw fitted/threaded together. Therefore, the entire bulk of the unit can be disassembled for wipe down or immersed in dish soap and water for cleaning and air dried.

Summary, Ramifications and Scope

Accordingly, the reader will see the SECOND CHANCE SECONDARY SMOKE TRAP will allow an individual to partake in the smoking of cigars or cigarettes while greatly reducing the amount of resultant smoke to the environment from the combustion of the smoking medium and the exhalation of secondary smoke. In addition the SECOND CHANCE SECONDARY SMOKE TRAP will help protect the environment and the lungs of non-smokers who do not wish to be subjected to secondary smoke.

Furthermore, the SECOND CHANCE SECONDARY SMOKE TRAP has the additional advantages in that it can easily be disassembled for cleaning and replacement of worn parts.

it is constructed primarily of non-toxic, non-flammable materials.

flammable materials are protected by non-flammable safeguards from spark or flame.

it can be adapted for cigars or cigarettes by interchanging a stainless steel support.

Although the description above contains many specificities, these should not be construed as limiting the scope of the invention but as merely providing illustration of some of the presently preferred embodiments of this invention. For example, the tubing sections could be constructed of materials other than polystyrene. A handle and base feet could be added for ease of manipulation and setting the unit down on surfaces. A lighter or ignition unit could be fitted onto the unit eliminating the need for matches.

Thus the scope of the invention should be determined by the appended claims and their legal equivalents, rather than by the examples given.

I claim:

1. A smoke containing, directing, and filtering device, comprising:
   a) an air tight cylindrically U-shaped tube having means for assembling and disassembling said U-shaped tube;
   b) a combustion chamber tube disposed in said air tight cylindrically U-shaped tube having a one-way inhalation valve and having an end, means for supporting a smoking medium in said combustion chamber tube;
   c) a fan unit disposed in said air tight cylindrically U-shaped tube, said fan unit driving fresh air into said end of said combustion chamber tube; and
   d) a filtration chamber tube in said U-shaped tube having a one way exhalation valve so that one can inhale smoke via said one way inhalation valve and can exhale smoke into said filtration chamber tube via said one way exhalation valve prior to allowing smoke into the environment.

2. A smoke containing, directing and filtering device as defined in claim 1, wherein said air tight cylindrically U-shaped tube is of polystyrene material.

* * * * *